US008206859B2

(12) United States Patent
Chowdhury

(10) Patent No.: US 8,206,859 B2
(45) Date of Patent: Jun. 26, 2012

(54) METHOD OF STABILIZING A STACK AFTER COMPLETING STARTUP, WITHOUT EXTENDING THE STARTUP TIME

(75) Inventor: Akbar Chowdhury, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 791 days.

(21) Appl. No.: 12/336,114

(22) Filed: Dec. 16, 2008

(65) Prior Publication Data

US 2010/0151286 A1 Jun. 17, 2010

(51) Int. Cl.
*H01M 8/04* (2006.01)
(52) U.S. Cl. .......................... 429/429; 429/444
(58) Field of Classification Search .................. 429/429, 429/444
See application file for complete search history.

(56) References Cited

U.S. PATENT DOCUMENTS

2005/0158601 A1* 7/2005 Skala .............................. 429/31
2005/0164057 A1* 7/2005 Pospichal et al. ............... 429/25

OTHER PUBLICATIONS

Miti Developments: Oil-Free Motorized Compressor Systems, Miti vol. 26 Mar. 2006, p. 1-2.*

* cited by examiner

*Primary Examiner* — Ula C Ruddock
*Assistant Examiner* — Frank Chernow
(74) *Attorney, Agent, or Firm* — John A. Miller; Miller IP Group, PLC

(57) ABSTRACT

A fuel cell system that controls the speed of the compressor providing cathode air to a fuel cell stack just after a system start-up procedure has ended so as to reduce the chance that the compressor current draw will cause a stack quick stop. The method includes recognizing a command for high compressor speed just after the system start-up procedure ends, where the stack is in the run state, and instead of providing a step change in the compressor command, ramping up the compressor speed so that the current draw from the compressor does not spike.

15 Claims, 3 Drawing Sheets

METHOD OF STABILIZING A STACK AFTER COMPLETING STARTUP, WITHOUT EXTENDING THE STARTUP TIME

BACKGROUND OF THE INVENTION

1. Field of the Invention

This invention relates generally to a system and method for reducing the chance of a fuel cell system quick stop because of a high current draw from the cathode compressor at the end of a system start-up procedure and, more particularly, to a system and method for reducing the chance of a fuel cell system quick stop because of a high current draw from the cathode compressor at the end of a system start-up procedure by gradually increasing the compressor speed command.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive maternal, such as stainless steel or a conductive composite. The end plates conduct the electricity generated by the fuel cells out of the stack. The bipolar plates also include flow channels through which a cooling fluid flows.

Fuel cell system start-up procedures can sometimes be delicate if the fuel cell stack is not at or near its optimal operating temperature, especially for cold or freeze start-up procedures. When a fuel cell stack is not at or near its operating temperature just after the start-up procedure, a high power request on the fuel cell stack may cause the stack voltage to be reduced below a value that could cause a stack quick stop to occur. A more detailed discussion of this process is given as follows.

After completing the start-up procedure of a fuel cell system where reactants are flowing through the stack at a rate that is sufficient to sustain the stack voltage and supply power to the parasitic loads, certain system procedures typically increase the cathode compressor flow rate to a high speed generally to dilute the hydrogen in the system exhaust stream. In one known fuel cell system design that employs an ultra-capacitor and a high voltage bus, a blocking diode separating the bus from the stack and a start-up contactor that by-passes the diode for starting up the fuel cell system, it is necessary to slow the compressor down to a very low speed in order to allow a transition from the start-up contactor to the main stack contactors. After the main contactors have closed, the system enters a run state and the compressor typically immediately receives a step request to increase the compressor flow rate a significant amount to provide anode exhaust dilution.

A problem exists in this procedure because the step change of the compressor flow rate corresponds to a large in-rush of current to the compressor motor. The stack is not always able to keep up with this large current in-rush, which can cause stack instability. This will be especially true for older stacks, and cold start-ups, which could lead to a system quick stop.

A related problem is that when a cold start is initiated and completed, the fuel cell system is not always in a completely stable state and may not be able to adequately accommodate a rapid power up transient shortly after completing the start-up procedure. During the initial period following the completion of the start-up procedure, the stack should undergo a period of conditioning before it is capable of successfully performing harsh power up-transients. conditioning is the first process by which the membranes in the stack reach an optimal humidification level whereby they are able to conduct protons efficiently. This generally takes place during normal operation once the stack has reached its operating temperature.

In another existing fuel cell system, the stack requests a step increase in a compressor flow rate immediately following the completion of a start-up procedure. Then, for a short period of time, the compressor maintains the higher flour rate as its minimum set-point, and if a high power request comes during that time that requires a higher flow rate, then a step change to the flow request takes place.

SUMMARY OF THE INVENTION

In accordance with the teachings of the present invention, a fuel cell system is disclosed that controls the speed of a compressor providing cathode air to a fuel cell stack just after a system start-up procedure has ended so as to reduce the chance that the compressor current draw will cause a stack quick stop. The method includes recognizing a command for high compressor speed just after the system start-up procedure ends, where the stack is in the run state, and instead of providing a step change in the compressor command, ramping up the compressor speed so that the current draw from the compressor does not spike.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for ramping up a compressor command just after a fuel cell system start-up procedure ends to reduce the chance of a system quick stop is merely exemplary in nature, and is in no way intended to limit the invention or its applications or uses.

Figure 1:
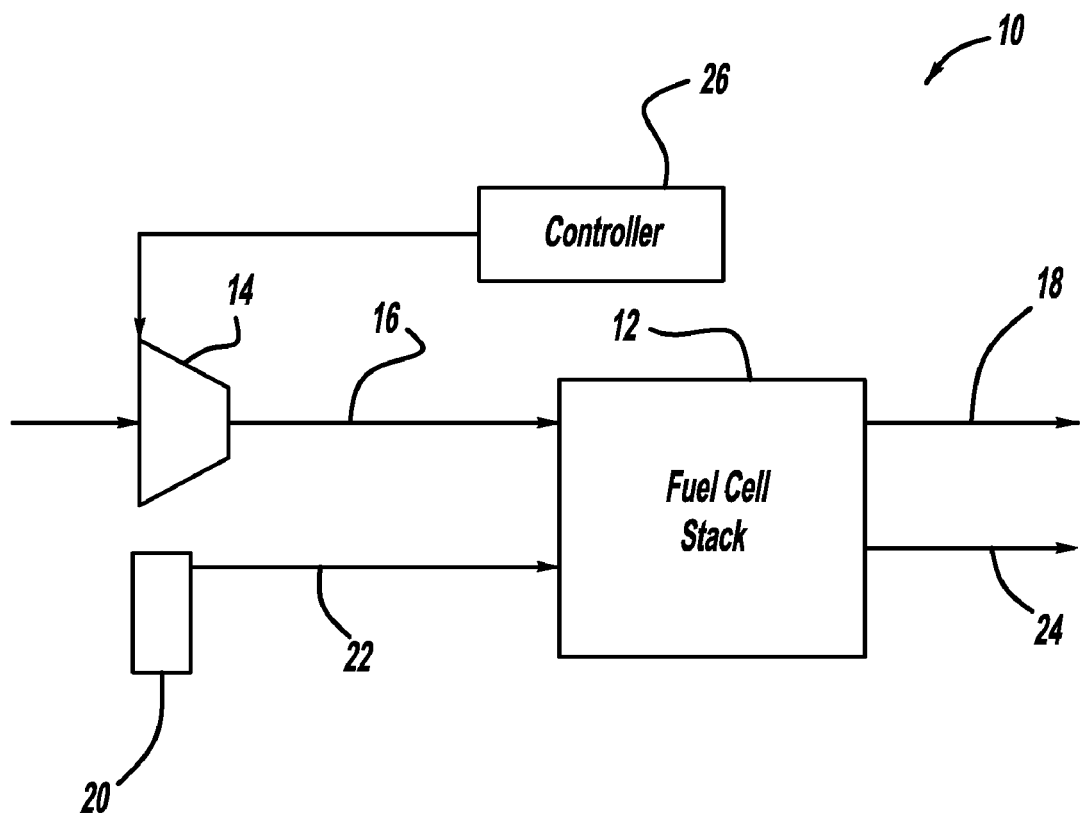
FIG. 1 is a simplified schematic block diagram of a fuel cell system.

FIG. 1 is a simplified block diagram of a fuel cell system 10 including a fuel cell stack 12. A compressor 14 provides cathode input air on cathode input line 16 to the cathode side of the fuel cell stack 12 and cathode exhaust is output on cathode exhaust gas line 18. Likewise, hydrogen gas is provided to the anode side of the fuel cell stack 12 from a hydrogen source 20 on anode input line 22, and anode exhaust is output from the fuel cell stack 12 on anode exhaust gas line 24. A controller 26 controls the operation of the fuel cell system 10 including the speed of the compressor 14. The controller 26 includes algorithms that operate the fuel cell system 10, such as start-up procedure algorithms.

As will be discussed below, the present invention proposes the control of a command signal for the compressor 14 just after a system start-up procedure ends when the system 10 is just entering a run state that prevents a step change in the compressor command signal for some period of time that may otherwise cause the compressor 14 to draw a large amount of current, which could have detrimental effects on the fuel cell stack 12, such as a quick stop, as discussed above. The compressor command signal control reduces the time rate of change of the compressor flow request just after the start-up procedure ends. Instead of a step change in the compressor flow request, which causes the compressor 14 to increase its speed at the fastest possible rate, all changes to the compressor flow request are performed as gradual increases. The rate of increase in the compressor flow request during this period is calibratable, and need not be linear. Numerous profiles for the rate increase could be used, such as S-curve, parabolic, asymptotic, etc.

The period immediately following a system start-up procedure is a crucial period for the fuel cell system 10. The stack 12 needs to be partially or fully conditioned before performing harsh power up transients. It is known that the actual rate of change of the compressor 14 is directly related to the amount of in-rush current that gets delivered to the stack 12. Therefore, requesting a steep step change in the compressor flow rate causes the compressor 14 to ramp up at its fastest possible rate, during which a spike is seen in the system current and a corresponding dip can be seen in the stack voltage. This operation can be very harsh, and the system 10 may not be fully capable of supporting a power up transient of this nature until some conditioning takes place in the stack 12. It is also believed that operating at high current densities before the stack 12 becomes conditioned is detrimental to the health of the stack 12 and may cause degradation reducing the life of the stack 12. One of the benefits of the proposed process is that during the period immediately following the completion of the start-up, slowing down the compressor transient rate gives the stack 12 more time to become conditioned. Also, since fuel cell system (FCS) modules typically use closed loop control based on feedback from a cathode mass flow/measurement, the rate at which power is generated, or consumed, also slows down as a result of the slowing of the transient rate of the compressor 14. It is also believed that a slow transient rate of the compressor flow rate can be utilized until the stack 12 comes up to its operating temperature, at which time the stack 12 is known to be well conditioned.

Figure 2:
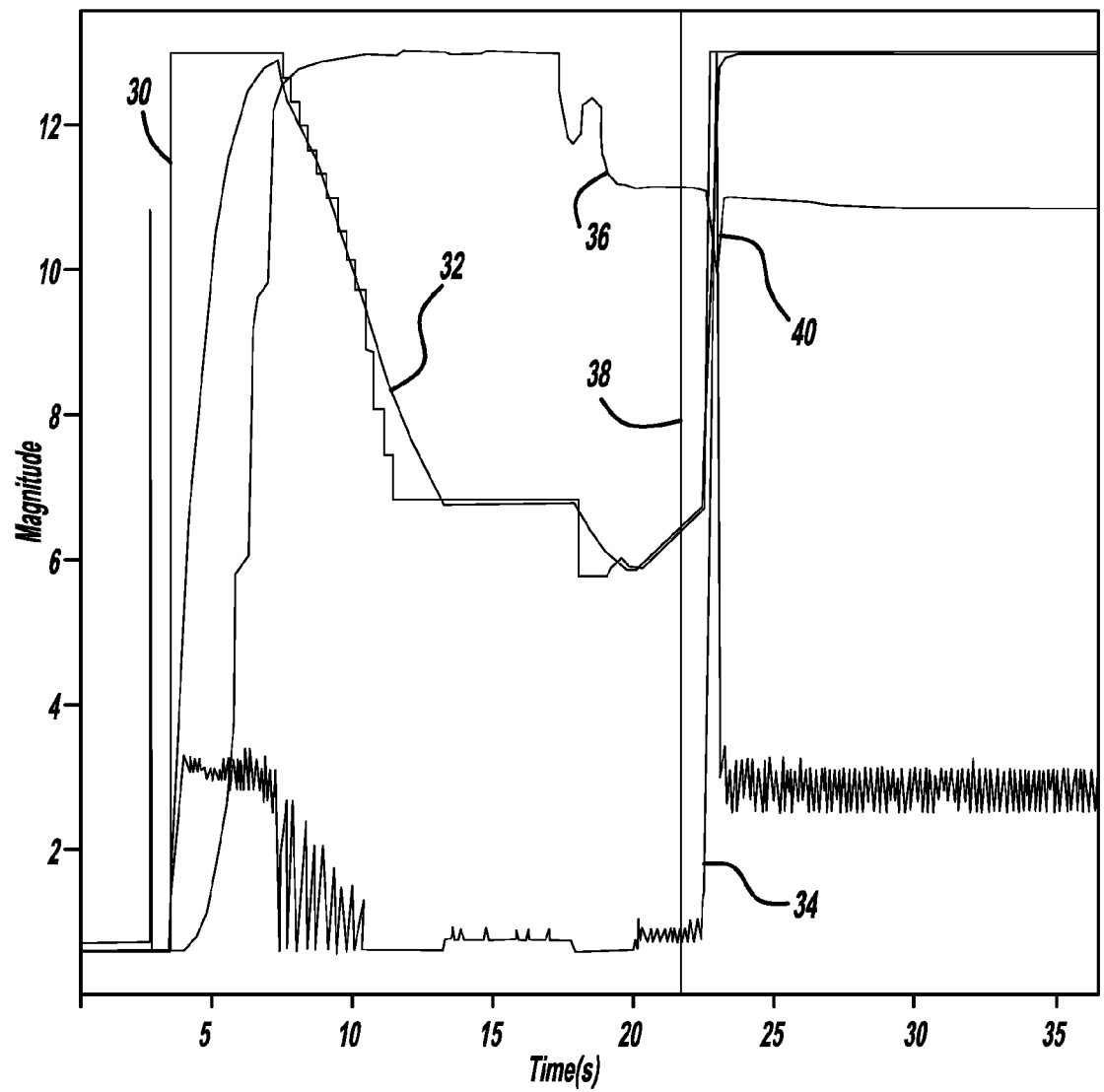
FIG. 2 is a graph with time on the horizontal axis and magnitude on the vertical axis showing compressor current draw, stack output power, compressor command signal and compressor speed for a compressor step command.

FIG. 2 is a graph with time on the horizontal axis and unit-less magnitude on the vertical axis that illustrates the problem with compressor step increases just after a system start-up procedure ends, as discussed above. Graph line 30 is a compressor speed command signal, graph line 32 is the compressor speed, graph line 34 is the compressor current draw and graph line 36 is the stack voltage output. Line 38 represents the time that the start-up procedure has been completed. As discussed above, various systems require an immediate compressor high speed increase command just after the start-up procedure. This step command in the compressor speed causes a spike in the compressor current draw that is reduced once the compressor 14 reaches its new operating speed. The compressor current draw causes a dip in the stack voltage at location 40, which could have detrimental effects on the stack 12 that is not conditioned because it is still relatively cool and the humidity level of the membranes is relatively low.

According to the invention, the controller 26 does not allow step increases in the compressor speed command signal for some period of time after the start-up procedures have been terminated.

Figure 3:
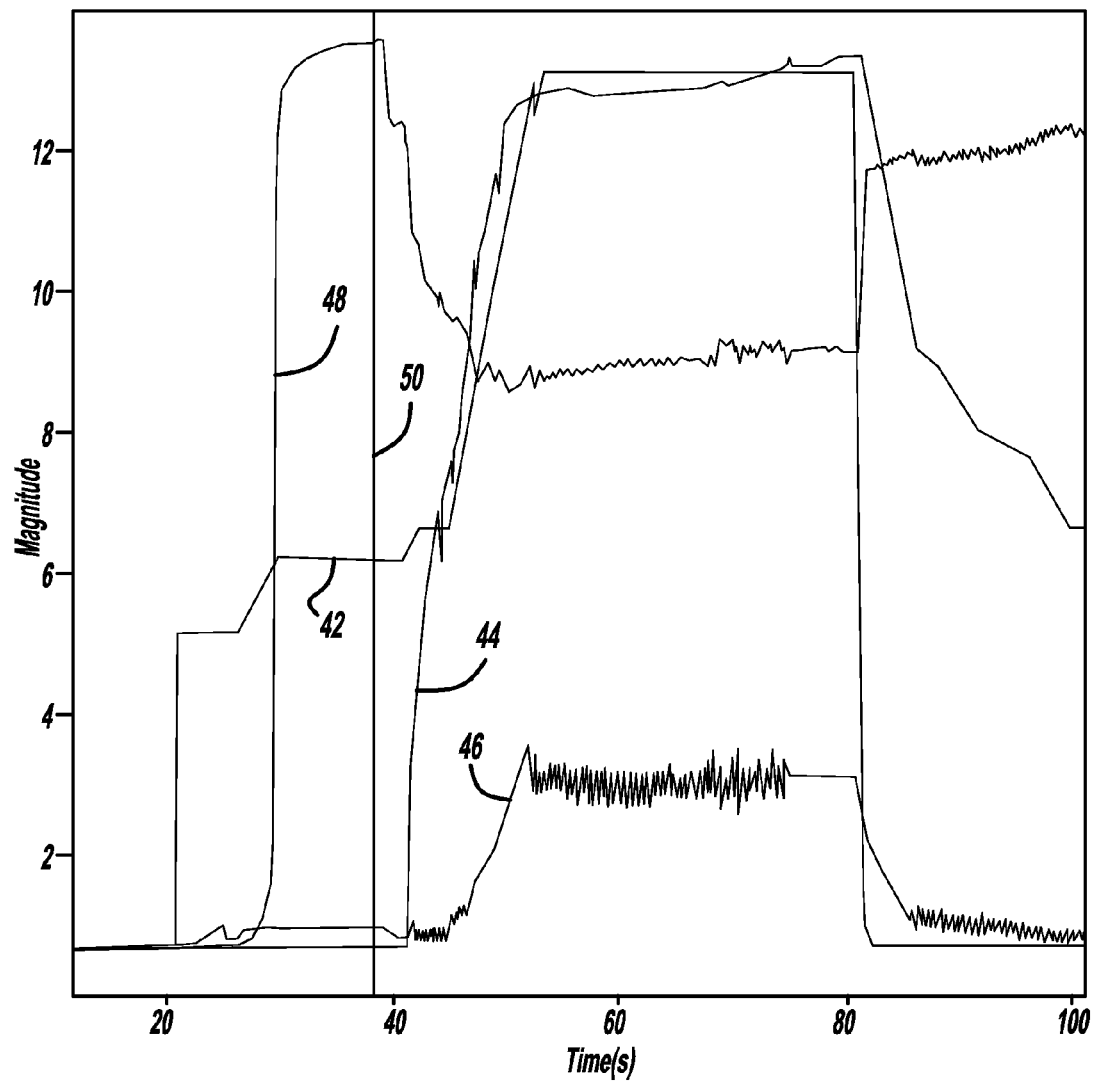
FIG. 3 is a graph with time on the horizontal axis and magnitude on the vertical axis showing compressor current draw, stack output power, compressor command signal, and compressor speed for a compressor ramp command.

FIG. 3 is a graph with time on the horizontal axis and unit-less magnitude on the vertical axis showing the result of limiting or ramping the compressor command speed signal, as discussed above. Graph line 42 is a compressor speed command signal, graph line 44 is the compressor speed, graph line 46 is the current draw from the compressor 14 and graph line 48 is the stack voltage output. As is apparent, the command for the compressor 14 is ramped from a certain speed after the start-up procedures have terminated at line 50 to a desired speed, instead of a step change. Further, it is clear that there is not a spike in the current draw from the compressor 14 as the compressor current gradually rises to the current it would draw at the increased speed.

In one non-limiting embodiment, the gradual compressor speed rate of change is limited to a time frame of about a minute after the start-up procedures have been terminated and may include a maximum compressor ramp up rate of 15,000 RPM/sec.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the speed of a compressor providing cathode air into a cathode side of a fuel cell stack in a fuel cell system, said method comprising: performing a start-up procedure when a start-up request is made for the fuel cell stack in the fuel cell system; determining that the start-up procedure has ended; recognizing a request for an increase in compressor speed to provide more air to the fuel cell stack after the start-up procedure has ended; and ramping the speed of the compressor from its current speed to the requested in a matter that does not include providing a step command signal to the compressor, wherein ramping the speed of the compressor includes ramping the speed of the compressor for a time frame of about a minute after the start-up procedure has ended.

2. The method according to claim 1 wherein ramping the speed of the compressor includes ramping the speed of the compressor up to a maximum rate of 15,000 RPM/sec.

3. The method according to claim 1 wherein ramping the speed of the compressor uses an S-curve signal.

4. The method according to claim 1 wherein ramping the speed of the compressor uses a parabolic signal.

5. The method according to claim 1 wherein ramping the speed of the compressor uses an asymptotic signal.

6. A method for controlling the speed of a compressor providing cathode air to a cathode side of a fuel cell stack in a fuel cell system, said method comprising: performing a start-up procedure when a start-up request is made for the fuel cell stack in the fuel cell system; determining that the start-up procedure has ended; recognizing a request for an increase in compressor speed to provide more air to the fuel cell stack after the start-up procedure has ended; and gradually increasing the speed of the compressor from its current speed to the requested speed in a manner that is calibrated and that prevents a step change in the speed of the compressor until the fuel cell stack has been conditioned, wherein gradually increasing the speed of the compressor includes gradually increasing the speed of the compressor for a time frame of about a minute after the start-up procedure has ended.

7. The method according to claim 6 wherein gradually increasing the speed of the compressor includes gradually increasing the speed of the compressor up to a maximum rate of 15,000 RPM/sec.

8. The method according to claim 6 wherein increasing the speed of the compressor uses an S-curve signal.

9. The method according to claim 6 wherein increasing the speed of the compressor uses a parabolic signal.

10. The method according to claim 6 wherein increasing the speed of the compressor uses an asymptotic signal.

11. A system for controlling the speed of a compressor providing cathode air to a cathode side of a fuel cell stack, said system comprising: means for performing a start-up procedure when a start-up request is made on the fuel cell stack; means for determining that the start-up procedure has ended; means for recognizing a request for an increase in compressor speed to provide more air to the fuel cell stack after the start-up procedure has ended; and means for ramping up the speed of the compressor from its current speed to the requested speed in a manner that does not include providing a step command, wherein the means for ramping the speed of the compressor ramps the speed of the compressor for a time frame of about a minute after the start-up procedure has ended.

12. The system according to claim 11 wherein the means for ramping the speed of the compressor ramps the speed of the compressor up to a maximum rate of 15,000 RPM/sec.

13. The system according to claim 11 wherein the means for ramping the speed of the compressor uses an S-curve signal.

14. The system according to claim 11 wherein the means for ramping the speed of the compressor uses a parabolic signal.

15. The system according to claim 11 wherein the means for ramping the speed of the compressor uses an asymptotic signal.

* * * * *